Patented Jan. 12, 1937

2,067,463

UNITED STATES PATENT OFFICE

2,067,463

N-LONG CHAIN ALKYL AROMATIC AMINO SULPHONIC ACIDS AND PROCESS OF PRODUCING SAME

Erik Schirm, Dessau-in-Anhalt, Germany, assignor, by mesne assignments, to "Unichem" Chemikalien Handels A.-G., Zurich, Switzerland, a corporation of Switzerland No Drawing. Application April 3, 1933, Serial No. 664,202. In Germany April 4, 1932

15 Claims. (Cl. 260—129)

It has been found that aromatic amino- or hydroxy-aminosulphonic acids which in the amino-group are substituted by at least one higher molecular aliphatic or alicyclic hydrocarbon residue (which may contain also hydroxyl-groups) with not less than 8 carbon atoms, are most useful penetrating-, wetting-out-, dispersing-, lathering- and cleansing agents.

The new products can be manufactured according to procedures well-known in themselves, viz. either by the introduction of the hydrocarbon residues by means of the corresponding halogen hydrocarbons obtainable from the corresponding alcohols by esterification with hydro-halogen, or by the conversion of higher molecular primary or secondary amines of the aliphatic or alicyclic series with hydroxy- or amino- or hydroxyamino-sulphonic acids of the aromatic series with the addition of catalysts such as zinc-chloride or more advantageously in presence of sodium-bi-sulphite (the so-called "Bucherer"-reaction). Finally the two aforementioned condensation procedures are also applicable to aromatic amino-, hydroxy- or hydroxyamino-compounds free of sulpho groups, the thus obtained condensation products being subsequently converted into a water soluble form by sulphonating.

As to the aforesaid starting materials there is to say that the higher molecular aliphatic or alicyclic alcohols can be obtained by the splitting or the reduction of waxes or substances of a wax-like constitution such as spermaceti, sperm-oil or by the reduction of fatty acids, of their natural glycerides such as cocoa-fat, palm-(kernel-) oil, animal greases, or of other esters of the same, of naphthenic acids or naphthenic acid esters by means of sodium according to the method of Bouveault and Blanc or by catalytic high pressure hydrogenation. As aliphatic alcohols to be considered there may be mentioned as preferred examples dodecyl-, myristyl-, cetyl-, octadecyl- and octadecenyl alcohol. On the other hand the higher molecular primary amines are accessible by the decomposing process of carboxylic acid amides which are by one carbon atom richer, by means of the modified reactions of Hofmann or Curtius, the halogenylamides or acid azides respectively being intermediate products.

Example 1

A concentrated aqueous solution of 297 parts by weight of aniline-2,4-disulphonic sodium (obtained in sulphonating 173 parts by weight of sulphanilic acid in well-known manner with fuming sulphuric acid of 20% until soluble in water, in decalcifying, in filtrating from gypsum, in reacting the filtrate with soda, in filtrating again and in evaporating) is heated for 6 hours in a stirring autoclave up to 180–200° together with the same volume of alcohol, 261 parts by weight of cetyl-chloride and 200 parts of crystalline sodium acetate. The contents of the autoclave, when cooled down, are shaked out with petrol ether, the watery layer is evaporated to dryness whereupon the 1-cetylaminebenzene-2,4-disulphonic sodium is isloated from the salt mixture by extraction with absolute alcohol. The new compound is easily soluble in water; the aqueous solution lathers very much, is of a good wetting-out and penetrating capacity and insensitive to lime- and magnesia salts.

The aniline-2,4-disulphonic acid may also be replaced by other aniline disulphonic acids, e. g. by toluidin-disulphonic acids or by the 1-amino-tetra-hydronaphthalene-2,4-disulphonic acid or similar aromatic aminosulphonic acids. The cetyl-chloride is most advantageously replaced by 9,10-octadecenyl-chloride which is obtained in esterifying the oleyl-alcohol with hydrochloric acid.

Example 2

400 parts by weight of α-naphthylamine and 205 parts by weight of dodecylchloride are heated for 5 hours to 180°. After cooling the reaction mixture to which 50 parts by weight of caustic sodium are added is treated with superheated steam until naphthylamine ceases to distill over. The residue is taken up in benzol, the benzolic solution is washed, dried and the benzol distilled off. The residue which in the main consists of dodecyl-α-naphthylamine with a small proportion of di-dodecyl-α-naphthylamine, is gradually stirred by cooling with ice into 900 parts by weight of fuming sulphuric acid containing 20% of anhydride, whereupon stirring is continued at room-temperature and if needed under heating to 40° until a specimen shows to be clear soluble in water. Then one pours out on ice, limes, filtrates from gypsum, and the calcium salt of the 1 - dodecylamino-naphthalene - disulphonic acid being in the filtrate is then transformed with soda into the sodium salt, which in its properties quite resembles to the product described in Example 1.

If one likes to prevent completely the formation of the di-alkyl-naphthylamine, the dodecyl-chloride may be converted with the sodium salt of the p-tolylsulphonic-α-naphthyl-amide (conf. German Patent No. 157,859) and in saponifying the condensation product one obtains pure monododecyl-α-naphthylamine.

Example 3

18 parts by weight of 2-naphthol-6,8-disulphonic sodium (G-salt) are heated for 6 hours in a stirring autoclave to 170–180° together with 40 parts by weight of a solution of sodium-bisulphite of 38/40° Bé., 20 parts by weight of dodecylamine and 28 parts by weight of 96% alcohol. The thus obtained semi-solid white mass is dissolved in much hot water, the solution is filtered while hot, soda lye added until the solution is strongly alkaline, and then evaporated to dryness in vacuo. The residue is first freed from excess dodecylamine by extraction with petrol ether, then one extracts with pure anhydrous alcohol which dissolves only the formed 2-dodecylamino-6,8-disulphonic sodium, whereas the admixed inorganic compounds remain unsolved. The reaction product separated from the alcohol forms a yellow crystalline powder, easily soluble in water with blue fluorescence. An aqueous 0.2% solution does not become turbid neither from lime- or from magnesia salts. It wets out and lathers very well and is absolutely stable to boiling caustic alkalis and mineral acids.

Without modifying the procedure it is possible to replace the 2-naphthol-6,8-disulphonic sodium by the equivalent amount of 2-naphthol-3,6-disulphonic sodium (R-salt) as well as of the 2,8-dihydroxy- or 2-amino-8-hydroxy-naphthaline-3,6-disulphonic sodium, whereby likewise the 2-standing hydroxyl- or amino-group respectively are replaced by the residue $C_{12}H_{25}.NH-$ and quite similar products are formed.

Example 4

45 parts by weight of 2-naphthol-3,6,8-trisulphonic sodium are heated for 6 hours in a stirring autoclave to 170–180° together with 80 parts by weight of a solution of sodium bisulphite of 38/40° Bé., 58 parts by weight of technical octodecylamine of B. P. 182–200° and 60 parts by weight of 96% alcohol. One works down as per Example 3. The thus obtainable 2-octadecylaminonaphthalene-3,6,8-tri-sulphonic sodium salt corresponds in its properties to the product obtained in Example 3. The fluorescence of the aqueous and alcoholic solution is green.

If in the foregoing example the octadecylamine is replaced by the 1-amino-11-hydroxy-8,9-heptadecen obtainable from ricinoleic acid by the Curtius decomposing process the resulting product is a similar one and is distinguished by a somewhat better solubility in water and alcohol.

The directions for use of the afore-described products are exactly the same as for the hitherto known penetrating-, wetting-out-, dispersing-, lathering- and cleansing agents, i. e. soaps, sulphonated fats and oils, ester salts of higher molecular fatty alcohols and the like. The stability of the new products to acids and alkalis and to the hardness producers of water is however by far superior to the known products.

In preparing treatment baths for textile refinements e. g. wetting-out and dyeing-baths, washing and carbonizing baths, amounts of 1 to 2 gr. of the described products per litre of liquor are generally sufficient to obtain the desired penetrating, wetting-out and cleansing effect.

If liquors unsoluble in water such as hydrocarbons, animal or vegetable oils and the like, are wished to be emulsified in water or in aqueous solutions, one dissolves likewise 1 to 2 gr. or if needed a higher proportion of the new products in 1 litre of liquor, whereupon one adds the oil to be emulsified and then one shakes or stirs thoroughly.

Solid substances which are liked to be dispersed in aqueous liquors, such as waxes and wax-like substances, dyestuffs or the like, can be intimately ground in dry form or in paste form with the new products before the watery liquor is added.

The afore-described products are of course allowed to be employed also together with soaps, sulphonated greases and oils and with other penetrating-, wetting-out-, dispersing-, lathering- and cleansing agents hitherto in use.

What I claim is:—

1. Penetrating-, wetting-out-, dispersing-, lathering- and cleansing agents consisting of aromatic aminosulphonic acids free of nitro groups which are substituted in the amino-group by at least one higher molecular hydrocarbon residue of the group consisting of the aliphatic and alicyclic hydrocarbon residues with not less than 8 carbon-atoms and in which the sulphonic and amino groups are attached directly to the aromatic nucleus.

2. Penetrating-, wetting-out-, dispersing-, lathering- and cleansing agents consisting of aromatic amino-sulphonic acids free of nitro groups which are substituted in the amino-group by at least one higher molecular aliphatic hydrocarbon residue with not less than 8 carbon-atoms and in which the sulphonic and amino groups are attached directly to the aromatic nucleus.

3. Penetrating-, wetting-out-, dispersing-, lathering- and cleansing agents consisting of aromatic amino-sulphonic acids free of nitro groups which are substituted in the amino-group by at least one higher molecular, unsaturated aliphatic hydrocarbon residue with not less than 8 carbon-atoms and in which the sulphonic and amino groups are attached directly to the aromatic nucleus.

4. Penetrating-, wetting-out-, dispersing-, lathering- and cleansing agents consisting of aromatic amino-sulphonic acids free of nitro groups which are substituted in the amino-group by at least one higher molecular, hydroxyl-substituted, aliphatic hydrocarbon residue with not less than 8 carbon-atoms and in which the sulphonic and amino groups are attached directly to the aromatic nucleus.

5. Penetrating-, wetting-out-, dispersing-, lathering- and cleansing agents consisting of aromatic amino-sulphonic acids free of nitro groups which are substituted in the amino-group by at least one hydrocarbon residue of a primary aliphatic alcohol having 12 to 18 carbon atoms and in which the sulphonic and amino groups are attached directly to the aromatic nucleus.

6. Penetrating-, wetting-out-, dispersing-, lathering- and cleansing agents consisting of aromatic amino-sulphonic acids free of nitro groups which are substituted in the amino-group by at least one hydrocarbon-residue, corresponding to the aliphatic primary alcohols having 8 to 18 carbon atoms in the molecule and in which the sulphonic and amino groups are attached directly to the aromatic nucleus.

7. Penetrating-, wetting-out-, dispersing-, lathering-, and cleansing agents consisting of aromatic amino-sulphonic acids free of nitro groups which are substituted in the amino-group by at least one hydrocarbon-residue, corresponding to the primary aliphatic alcohols having 16 to 18 carbon atoms and in which the sulphonic and amino groups are attached directly to the aromatic nucleus.

8. Penetrating-, wetting-out-, dispersing-, lathering- and cleansing agents consisting of aromatic amino-sulphonic acids free of nitro groups which are substituted in the amino-group by at least one higher molecular alicyclic hydrocarbon residue with not less than 8 carbon-atoms and in which the sulphonic and amino groups are attached directly to the aromatic nucleus.

9. Penetrating-, wetting-out-, dispersing-, lathering- and cleasing agents consisting of aromatic amino-sulphonic acids free of nitro groups which are substituted in the amino-group by at least one naphthenic residue with not less than 8 carbon-atoms and in which the sulphonic and amino groups are attached directly to the aromatic nucleus.

10. Penetrating-, wetting-out-, dispersing-, lathering- and cleansing agents consisting of amino-benzene-sulphonic acids free of nitro groups which are substituted in the amino-group by at least one higher molecular hydrocarbon residue of the group consisting of the aliphatic and alicyclic hydrocarbon residues with not less than 8 carbon-atoms.

11. Penetrating-, wetting-out-, dispersing-, lathering- anid cleansing agents consisting of amino-benzene-disulphonic acids free of nitro groups which are substituted in the amino-group by at least one higher molecular aliphatic hydrocarbon residue with 8 to 18 carbon-atoms.

12. Penetrating-, wetting-out-, dispersing-, lathering- and cleasing agents consisting of amino-tetra-hydronaphthalene sulphonic acids free of nitro groups which are substituted in the amino-group by at least one higher molecular hydrocarbon residue of the group consisting of the aliphatic and alicyclic hydrocarbon residues with not less than 8 carbon-atoms.

13. Penetrating-, wetting-out-, dispersing-, lathering- and cleansing agents consisting of amino-tetra-hydronaphthalene disulphonic acids free of nitro groups which are substituted in the amino-group by at least one higher molecular aliphatic hydrocarbon residue with 8 to 18 carbon-atoms.

14. Penetrating-, wetting-out-, dispersing-, lathering- and cleansing agents consisting of amino-naphthalene-poly-sulphonic acids free of nitro groups which are substituted in the amino-group by at least one higher molecular aliphatic hydrocarbon residue with 8 to 18 carbon-atoms.

15. The method of producing aromatic amino sulphonic acids free of nitro groups which are substituted in the amino group by high molecular hydrocarbon radicals which comprises reacting aromatic amine sulphonic acids in which the sulphonic and amino groups are attached directly to the aromatic nucleus with chlorides of high molecular alcohols of the group consisting of the aliphatic and alicyclic alcohols containing not less than 8 carbon atoms in the molecule.

ERIK SCHIRM.